(12) United States Patent
Watkins et al.

(10) Patent No.: US 12,186,743 B2
(45) Date of Patent: Jan. 7, 2025

(54) REAGENT MANIFOLD WITH IN-LINE FILTER

(71) Applicant: Beckman Coulter, Inc., Brea, CA (US)

(72) Inventors: Nicholas Everette Watkins, Sacramento, CA (US); Garrick Anthony Maurer, Roseville, CA (US); Richard Milson, Citrus Heights, CA (US); Frederick Rupisan Cuenco, Antelope, CA (US); Christopher Dallas Griner, Sacramento, CA (US)

(73) Assignee: Beckman Coulter, Inc., Brea, CA (US)

( * ) Notice: Subject to any disclaimer, the term of this patent is extended or adjusted under 35 U.S.C. 154(b) by 783 days.

(21) Appl. No.: 17/471,945

(22) Filed: Sep. 10, 2021

(65) Prior Publication Data

US 2022/0008910 A1    Jan. 13, 2022

Related U.S. Application Data

(63) Continuation of application No. PCT/US2020/022008, filed on Mar. 11, 2020.
(Continued)

(51) Int. Cl.
*B01L 3/02* (2006.01)

(52) U.S. Cl.
CPC ....... *B01L 3/0293* (2013.01); *B01L 2200/026* (2013.01); *B01L 2200/0689* (2013.01);
(Continued)

(58) Field of Classification Search
CPC ............ B01L 3/0293; B01L 2200/026; B01L 2200/0689; B01L 2200/16;
(Continued)

(56) References Cited

FOREIGN PATENT DOCUMENTS

| JP | S 61-014573 A | 1/1986 |
|---|---|---|
| JP | S 61-086990 A | 5/1986 |

(Continued)

OTHER PUBLICATIONS

International Search Report and Written Opinion dated May 27, 2020 for International Application No. PCT/US2020/022008, 35 pages.

(Continued)

*Primary Examiner* — Jill A Warden
*Assistant Examiner* — Michael Stanley Gzybowski
(74) *Attorney, Agent, or Firm* — FROST BROWN TODD LLP

(57) ABSTRACT

Automated biological testing systems may advantageously allow users to perform some maintenance or upkeep of the system, such as replacing or refilling reagent, or replacing gaskets, hoses, filters, and other components. A manifold seal and filtration system including a gasket, retaining ring, and filter is usable with a manifold of such a system to transport reagent from a bottle to the testing system. The gasket includes features to prevent leakage and erroneous installation, and may be replaced by a user during normal maintenance or to select a gasket material to accommodate a particular type of reagent. The retention ring and filter include features to prevent particulate from passing into the testing system when reagent bottles are changed, and to prevent accidental displacement during removal of the gasket, or flushing of the manifold to clean the filter.

19 Claims, 8 Drawing Sheets

Related U.S. Application Data

(60) Provisional application No. 62/818,461, filed on Mar. 14, 2019.

(52) U.S. Cl.
CPC ... *B01L 2200/16* (2013.01); *B01L 2300/0681* (2013.01); *B01L 2300/123* (2013.01)

(58) Field of Classification Search
CPC ....... B01L 2300/0681; B01L 2300/123; G01N 35/1002; B67D 7/0288
See application file for complete search history.

(56) References Cited

FOREIGN PATENT DOCUMENTS

| | | |
|---|---|---|
| JP | H 10-137557 A | 5/1998 |
| WO | WO 2008/076725 | 6/2008 |
| WO | WO 2016/004171 | 1/2016 |
| WO | WO 2016/132020 | 8/2016 |
| WO | WO 2017/044532 | 3/2017 |

OTHER PUBLICATIONS

Chinese Office Action dated Aug. 24, 2022 for Application No. 2020800203762, 8 pages.
Decision to Grant a Patent for JP 2021-554689 dated Jun. 7, 2024, 2 pages.

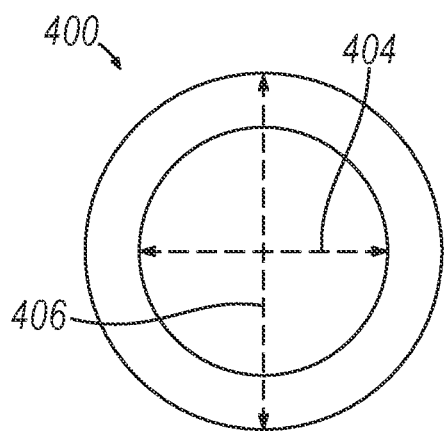
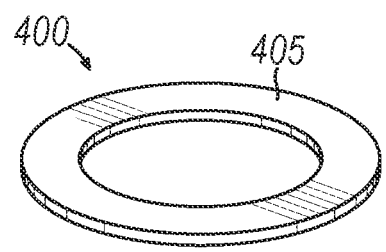
FIG. 7A  FIG. 7B
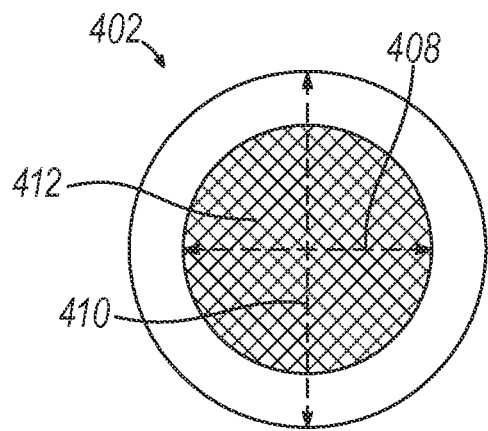
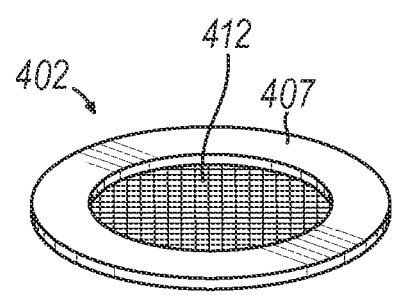
FIG. 8A  FIG. 8B

REAGENT MANIFOLD WITH IN-LINE FILTER

This application is a continuation of International Application Number PCT/US20/22008, titled "Reagent Manifold With In-Line Filter," filed in the United States Patent Office on Mar. 11, 2020, which is related to, and claims the benefit of, previously filed provisional patent application No. 62/785,863, titled "Reagent Manifold With In-Line Filter," filed in the United States Patent Office on Mar. 14, 2019. Those applications are hereby incorporated by reference in their entirety.

BACKGROUND

Various types of tests related to patient diagnosis and therapy can be performed by analysis of the patient's microorganisms, or "microbes." Microbes are microscopic living organisms such as bacteria, fungi, or viruses, which may be single-celled or multicellular. Biological samples containing the patient's microorganisms may be taken from a patient's infections, bodily fluids or abscesses and may be placed in test panels or arrays, combined with various reagents, incubated, and analyzed to aid in treatment of the patient. Automated biochemical analyzers or biological testing systems have been developed to meet the needs of health care facilities and other institutions to facilitate analysis of patient samples and to improve the accuracy and reliability of assay results when compared to analysis using manual operations and aid in determining effectiveness of various antimicrobials.

To improve the usability and reliability of automated biological testing systems, it may be advantageous to implement systems having one or more feature that increase the period of time or usage between necessary maintenance, allow end users to replace certain components or materials, or allow users to perform basic cleaning and maintenance tasks. In this manner, the performance and accuracy of the automated biological testing system may be maintained at a high level through numerous uses without reliance upon outside technicians or frequent service calls.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

FIG. 7A depicts a top down view of an exemplary retaining ring usable with the reagent manifold of FIG. 3;

FIG. 7B depicts a perspective view of the retaining ring of FIG. 7A;

FIG. 8A depicts a top down view of an exemplary filter usable with the reagent manifold of FIG. 3;

FIG. 8B depicts a perspective view of the filter of FIG. 8A;

Figure 1:
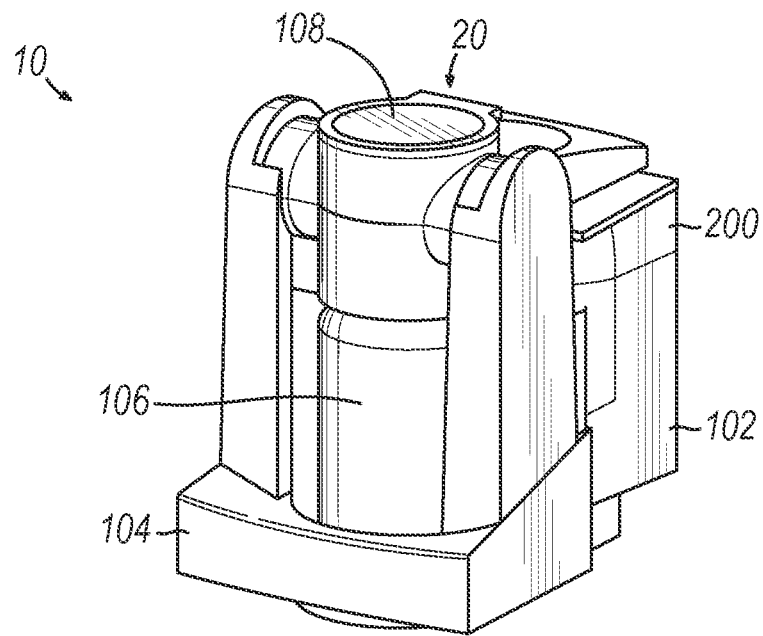
FIG. 1 depicts a front perspective view of an exemplary bottle holder assembly of a biological testing system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Exemplary Reagent Manifold

Figure 2:
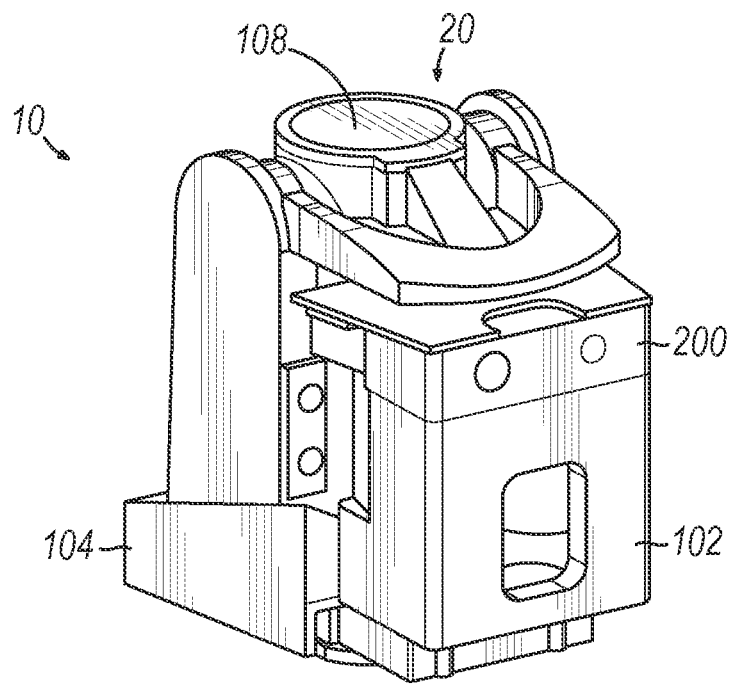
FIG. 2 depicts a rear perspective view of the bottle holder assembly of FIG. 1.

Turning now to the figures, FIGS. 1 and 2 depict front and rear perspective views of an exemplary bottle holder assembly (10) of a biological testing system. The bottle holder assembly (10) is adapted to receive and hold a reagent bottle (20), and extract reagent from the reagent bottle (20) as needed during testing of biological samples. A single biological testing system may have one or more bottle holder assemblies, such as the bottle holder assembly (10), with each assembly configured to provide a particular reagent to the biological testing system. The one or more bottle holder assemblies may be installed within a drawer or other area of the biological testing system that is temperature controlled, humidity controlled, or otherwise environmentally sealed. Each of the one or more bottle holder assemblies may be coupled with a reagent distributor assembly (not pictured) of the biological testing system, which may receive reagent from one or more of the bottle holder assemblies as required, and may direct reagent to a device of the biological testing system operable to combine the reagent or reagent with biological samples.

Figure 4:
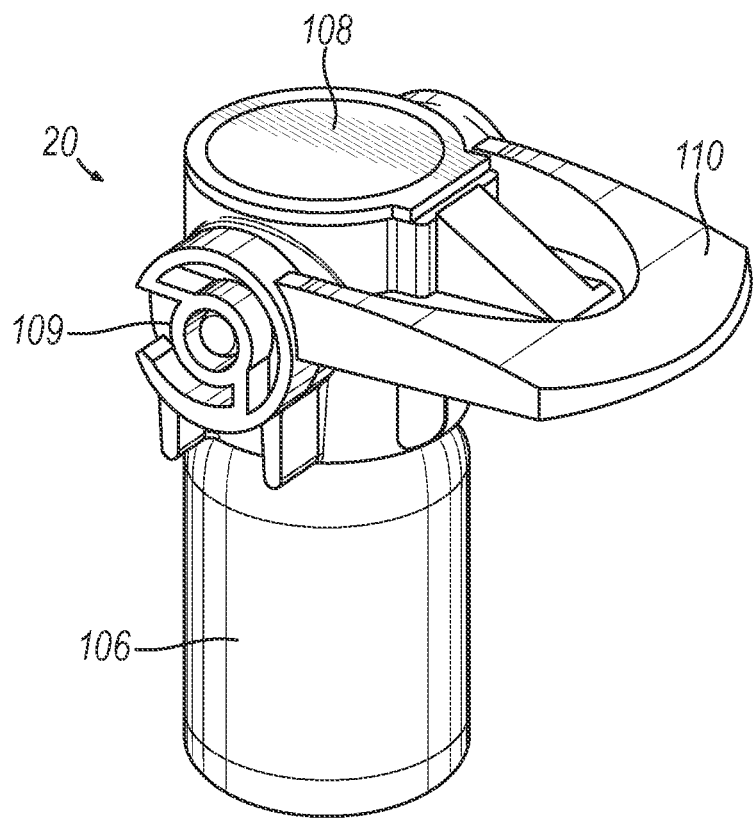
FIG. 4 depicts an exemplary reagent bottle usable with the reagent manifold of FIG. 3.

The bottle holder assembly (10) includes a bottle slot (104) sized and shaped to receive a reservoir (106) of the reagent bottle (20). An assembly case (102) is attached to the bottle slot (104), and a reagent manifold (200) may be installed on the assembly case (102). The assembly case (102) holds the reagent manifold (200), and also provides a route for power, data, and fluid connections to travel from the bottle holder assembly (10) to the reagent distributor assembly or other portions of the biological testing system. When the bottle (20) is placed in the bottle slot (104), a bottle cap (108) is guided into place above and coupled with the reagent manifold (200) to provide a sealed coupling between the reagent manifold (200) and the reagent bottle (20) for receiving reagent. With reference to FIG. 4, which shows the reagent bottle (20) removed from the bottle holder assembly (10), a bottle handle (110) can be seen in a lowered position. The bottle handle (110) can be rotated about the bottle cap (108) from a raised position to the lowered position shown in FIG. 4. The bottle handle (110) may be rotated approximately 90 degrees from the shown lowered position to the raised position prior to placing the reagent bottle (20) in the bottle slot (104). While the reagent bottle (20) is in the bottle slot (104), the bottle handle (110) may be returned to the shown lowered position to cause a slotted axis (109) to tightly engage with the vertical portions of the bottle slot (104) and hold the reagent bottle in place against the reagent manifold (200).

Figure 3:
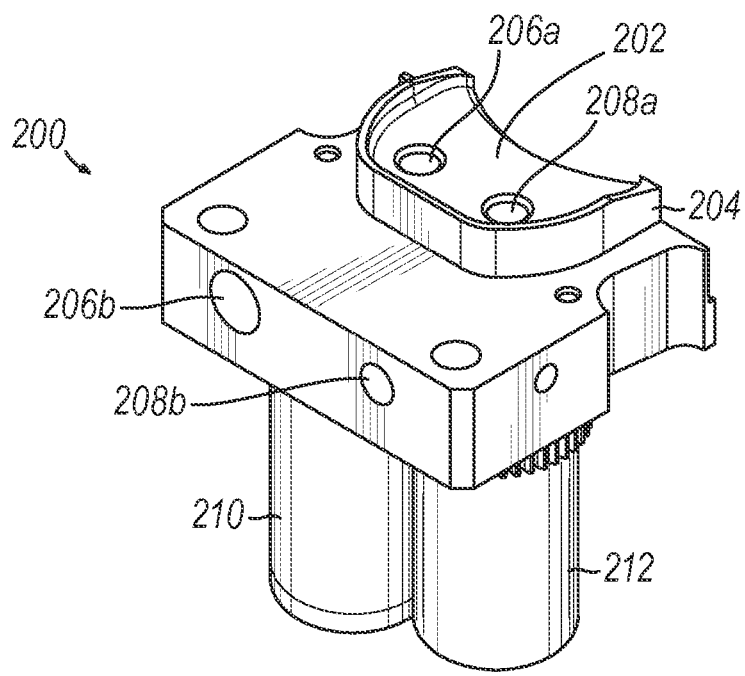
FIG. 3 depicts an exemplary reagent manifold of the bottle holder assembly of FIG. 1.

FIG. 3 depicts an exemplary reagent manifold (200) of the bottle holder assembly (10) of FIG. 1. The reagent manifold (200) includes a bottle receiver (202) and spill guard (204) that are sized and shaped to receive an underside of the bottle cap (108) when the reagent bottle (20) is placed in the bottle holder assembly (10). The bottle receiver (202) has a flat surface on which an air intake channel opening (206a) and a reagent outlet channel opening (208a) are positioned to couple with corresponding channels of the bottle cap (108) when the reagent bottle (20) is installed. The air intake channel passes from the air intake channel opening (206a), through the reagent manifold (200), and terminates at an air intake channel opening (206b). The reagent outlet channel passes from the reagent outlet channel opening (208a), through the reagent manifold (200), and terminates at a reagent outlet channel opening (208b).

The reagent manifold (200) is adapted to couple with an air valve (210) and a reagent valve (212). The air valve (210) is selectively operable to control (e.g., prevent, or allow at varying rates) the flow of air through the air intake channel, while the reagent valve (212) is selectively operable to control (e.g., prevent, or allow at varying rates) the flow of reagent through the reagent outlet channel. During operation of the bottle holder assembly (10), pressurized air may be provided to the reagent bottle (20) through the air intake channel, while reagent may be extracted from the reagent bottle (20) through the reagent outlet channel as a result of pressurization of the reagent bottle (20). The reservoir (106) and bottle cap (108) include internal components (not pictured) configured to allow controlled extraction of reagent from the reservoir as a result of pressurization. As one example, this may include operating the reagent valve (212) to close the reagent outlet channel, operating the air valve (210) to open the air intake channel, providing pressurized air to the air intake channel from an attached air source (e.g., an oxygen tank, an oxygen pump) until a desired pressure of the reagent bottle (20) is reached (e.g., corresponding to the amount of reagent desired to be extracted), and then reversing the state of each valve to allow the reagent to flow from the reagent outlet channel.

Figure 11:
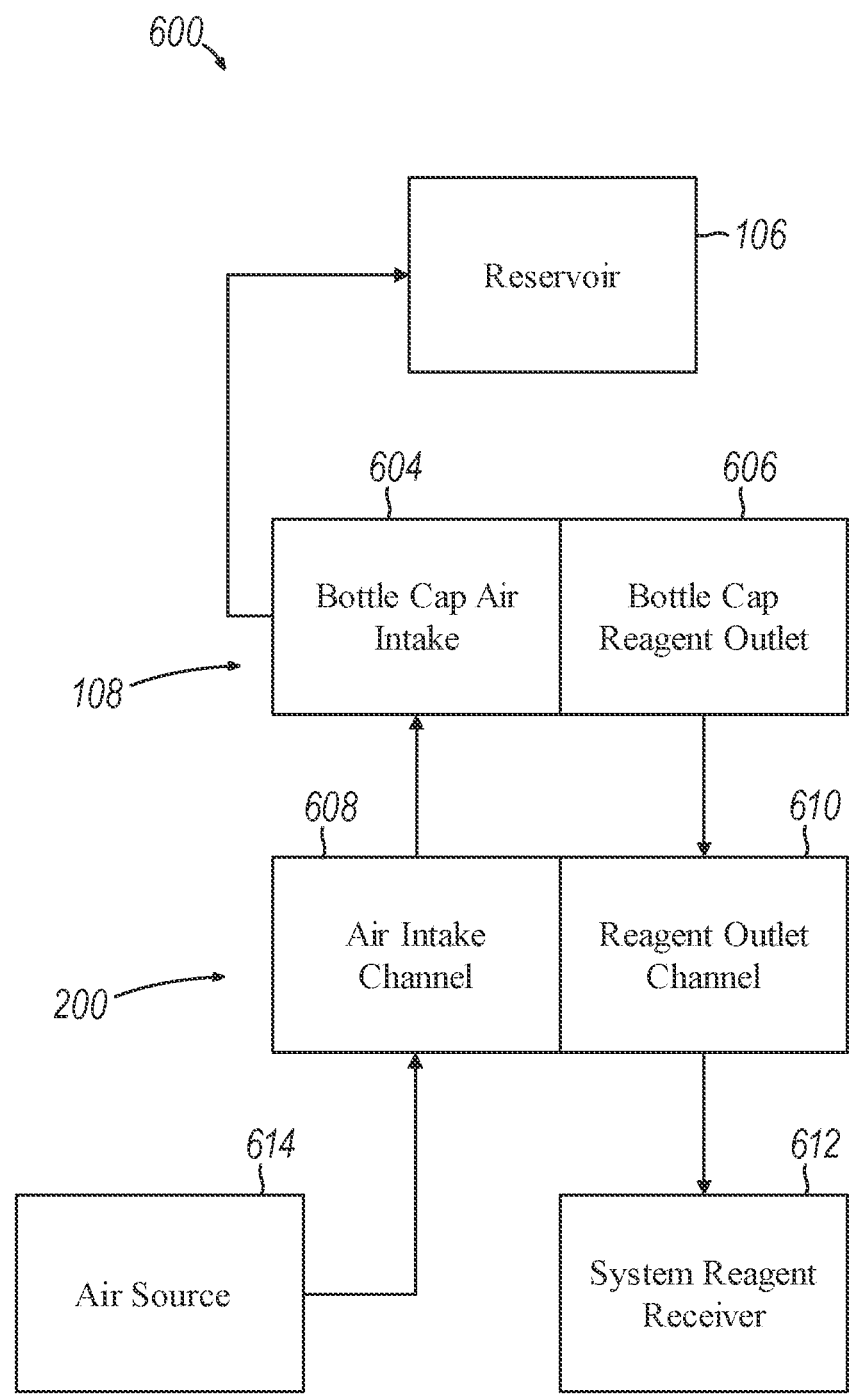
FIG. 11 depicts a schematic diagram illustrating an exemplary flow of reagent to the biological testing system from the bottle holder assembly of FIG. 1.

As a further example, with reference to FIG. 11, that figure depicts a schematic diagram illustrating an exemplary flow of reagent to the biological testing system from the bottle holder assembly (10). Pressurized air may be provided from an air source (614) to the air intake channel (608), passing through the reagent manifold (200) into a bottle cap air intake (604) that is positioned on the underside portion of the bottle cap (108) that contacts the bottle receiver (202) surface of the reagent manifold (200). The bottle cap air intake (604) allows the pressurized air to pass into the reservoir (106), which itself is configured to push corresponding amounts of reagent fluid through a bottle cap reagent outlet (606) that is positioned on the underside portion of the bottle cap (108) that contacts the bottle receiver (202) surface. Reagent fluid that is pushed through the bottle cap reagent outlet (606) is received by the reagent outlet channel (610), and passes through the reagent manifold (20) to be received by a testing system reagent receiver (612). The testing system reagent receiver (612) may be, for example, the above described reagent distributor assembly, which may be coupled to the reagent outlet channel (610) via a hose or other connection cable of fluid transfer.

II. Exemplary Manifold Gasket

Figure 5:
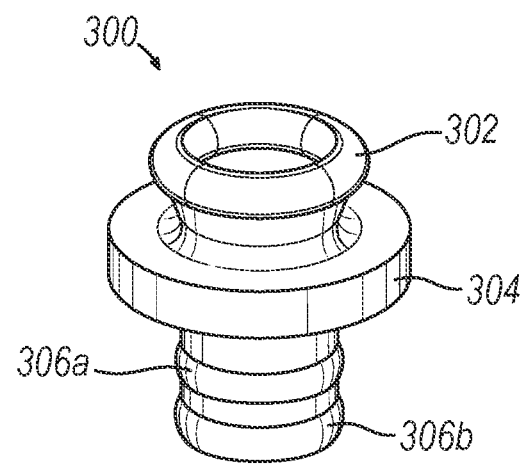
FIG. 5 depicts an exemplary gasket usable with the reagent manifold of FIG. 3.

Since pressurized air and reagent are exchanged between the reagent manifold (200) and the reagent bottle (20) during use, it may be advantageous to implement the bottle holder assembly (10) with one or more features that contribute to maintaining a seal between the reagent manifold (200) and the reagent bottle (20), while still allowing a user to easily change the reagent bottle (20) when emptied. As an example, FIG. 5 depicts an exemplary gasket (300) usable with the reagent manifold (200) that includes one or more such features.

Figure 6:
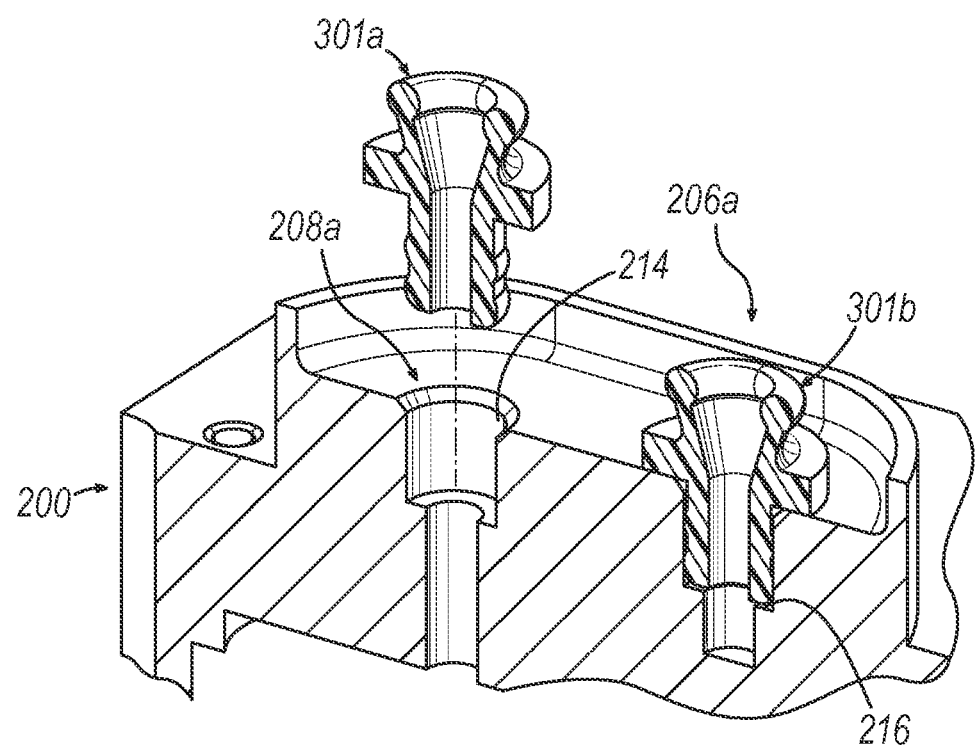
FIG. 6 depicts a cross sectional view of the reagent manifold of FIG. 3 with a set of exemplary gaskets such as the gasket of FIG. 5.

The gasket (300) includes a bellows seal (302), a limiter (304), and a set of radial seals (306a, 306b). The gasket (300) may be created from a variety materials, including polymers of various characteristics that allow some flexibility of the components of the gasket (300) to aid in sealing. FIG. 6 depicts a cross sectional view of a set of gaskets (301a, 301b) in use with the reagent manifold (200). In the cross sectional view of the reagent manifold (200), an air channel bore (216) can be seen proximate to the air intake channel opening (206a), and a reagent channel bore (214) can be seen proximate to the reagent outlet channel opening (208a).

A gasket (301a), similar to the gasket (300), has a lower portion having a diameter corresponding to the diameter of the reagent channel bore (214), such that the gasket (301a) can be removably inserted into the reagent channel bore (214) with some effort. A gasket (301b), similar to the gasket (300), has a lower portion having a diameter corresponding to the air channel bore (216), such that the gasket (301b) can be removably inserted into the air channel bore (216) with some effort.

When the gasket (300) is installed in a bore of the reagent manifold (200), such as the gasket (301b) is installed within the air channel bore (216), the combination of the corresponding (e.g., substantially similar, slightly larger than, or slightly less than) diameter of the gasket (300) to the bore, the flexible material of the gasket (300), as well as the one or more radial seals such as the radial seal (306a), create a seal between the gasket (300) and the reagent manifold (200) sufficient to withstand the pressurized air and reagent fluid transported through the reagent manifold (200) while preventing or substantially mitigating pressure related leakage.

The bellows seal (302) is positioned and shaped to seal against a corresponding channel of the bottle cap (108) (e.g., the bottle cap air intake (604), the bottle cap reagent outlet (606)) when the reagent bottle (20) is installed in the bottle holder assembly (10) and held against the reagent manifold (200). The fit of the reagent bottle (20) within the bottle slot (104) when the bottle handle (110) is in the lowered position (104) seen in FIG. 4 creates a downwards pressure on the bottle cap (108) against the bellows seal (302) resulting in a seal between the reagent manifold (200) and the reagent bottle (20) sufficient to withstand the pressurized air and reagent fluid transported from the reagent bottle (20) while preventing or substantially mitigating pressure related leakage.

The bellows seal (302) receives a downwards force from the bottle cap (108) when the reagent bottle (20) is locked in place, but in some implementations of the gasket (300) this force may not translate from the exterior portion of the gasket (300) (e.g., the portion of the gasket (300) that remains outside of the bore) to the interior portion of the gasket (300) (e.g., the portion of the gasket (300) that is within the bore). In such implementations, the downwards force from the locked bottle cap (108) may not substantially contribute to maintaining a seal between the gasket (300) and the reagent manifold (200). In such implementations, the combination of the bellows seal (302) and the one or more radial seals (306a, 306b) may be advantageous in sealing the gasket (300) against each contacting component.

Other features of the gasket (300) include the limiter (304), which is positioned between the internal portion and external portion of the gasket. While the internal portion of the gasket is correspondingly sized to a bore of the reagent manifold (200) which it is inserted in, the limiter (304) is sized to have a diameter larger or substantially larger than the corresponding bore, to prevent over-insertion of the gasket (300) into a bore. As an example, since the gasket (300) may be implemented with various flexible elastomer materials, a gasket lacking any insertion limiting feature may be forced by a user during installation causing exterior portions of the gasket to deform into the bore, which may result in a bellows seal of the exterior portion being unable to seal against the reagent bottle (20).

As an additional feature, the bellows seal (302) on the exterior portion of the gasket (300) may also be implementing having a diameter larger or substantially larger than the corresponding bore that it is to be installed in. In this manner, a user may be prevented from installing the gasket (300) in a corresponding bore upside down. As an example, where the bellows seal (302) is implemented having a diameter similar to the interior portion of the gasket (300), a user may mistakenly install the gasket (300) into the bore with the bellows seal (302) leading, which may result in an inability to seal against the reagent manifold (300), the reagent bottle (20), or both.

Reagents that are contained within the reagent bottle (20) may vary, and may be hazardous to both humans as well as non-organic materials. As an example, repeated exposure of the gasket (300) to some reagent types may result in the gasket (300) shrinking, hardening, drying, or otherwise deteriorating, resulting in a progressive loss of sealing ability. As has been described, a biological testing system may have a plurality (e.g., 10 or more) bottle holder assemblies, such as the bottle holder assembly (10), each supplying a different type of reagent. Since each reagent type may have different attributes and effects on the materials of the gasket (300), the gasket (300) itself can be implemented in a variety of materials, each being more robust, more predictable, or otherwise more performant with respect to a particular reagent type. Gasket material may be selected based on duration of use (e.g., matching each reagent type with a gasket whose material is most durable with respect to that reagent type), or to provide a predictable maintenance or replacement interval (e.g., selecting gasket materials so that the gasket for each reagent type has a similar usable life, and all gaskets for a particular system may be replaced simultaneously), or based upon other metrics such as cost.

As an example, gaskets formed of an ethylene propylene diene methylene rubber of durometer 50A have been found to provide acceptable sealing capabilities and usable life with all reagent types. For reagent types containing alpha-naphthol, gaskets formed of a fluorosilicone or a fully dynamically vulcanized ethylene propylene diene monomer in a thermoplastic matrix of polypropylene have been found to provide some advantages in sealing capabilities and usable life. For reagent types that do not contain alpha-naphthol, gaskets formed of a perfluoroelastomer, a tetra polymer of ethylene, tetrafluoroethylene and perfluoromethylvinylether, a highly fluorinated fluorocarbon, a tetrafluoroethylene propylene, a fluoroelastomer, or a chlorosulfonated polyethylene have been found to provide some advantages in sealing capabilities and usable life.

III. Exemplary Reagent Channel Filter

Some reagent types may, as a result of evaporation, exposure to air, or other conditions, form crystals or other small particulate that may pass through the reagent outlet channel (610) during subsequent testing. Replacement of the reagent bottle (20) may introduce further particulate from the surrounding environment or on the contact portions of the bottle cap (108). Particulate passing through the reagent outlet channel (610) may damage or reduce the performance of downstream components, such as the reagent valve (212), other pumps or valves, or components of the reagent distributor assembly. As a result, it may be advantageous to filter outgoing reagent prior to exiting the reagent outlet channel (610).

FIGS. 7A-7B and 8A-8B show a retaining ring (400) and a filter (402) that may be used with the reagent manifold (200) to prevent or mitigate risks associated with particulate. FIGS. 7A and 7B show the retaining ring (400), which may have a diameter (406) corresponding to the diameter of a bore (e.g., the reagent channel bore (214), the air channel bore (216)), such that the retaining ring (400) may friction fit within a bore when installed. FIGS. 8A and 8B show the filter (402), which includes a filtering component (412), and which has a diameter (410) corresponding to the diameter of a bore to provide a friction fit when installed. An inner diameter (404) of the retaining ring (400) may correspond to an inner diameter (408) of the filter (402). A thickness (405) of the retaining ring (400) and a thickness (407) of the filter (402) may be varied based upon the depth of a bore and the overall length of the gasket (300), and may be varied to provide a desired level of rigidity to prevent deformation as a result of pressurized air or liquid.

The filtering component (412) may be a filter layer or layers having one or more characteristics such as a mesh material, a plastic mesh material, a woven mesh material, or a peek plastic material. Filter opening size may be, for example, between about 50 and about 150 micrometers, with an opening of 100 micrometers providing an advantageous level of particulate filtering. Filter thickness may be, for example, between about 30 and 70 micrometers, with a thickness of 50 micrometers providing an advantageous thickness for balancing filtering and flow rate. Filter porosity may be, for example, between about 50% and about 70% open area, with a porosity of 58% providing an advantageous porosity for balancing filtering and flow rate.

Figure 9:
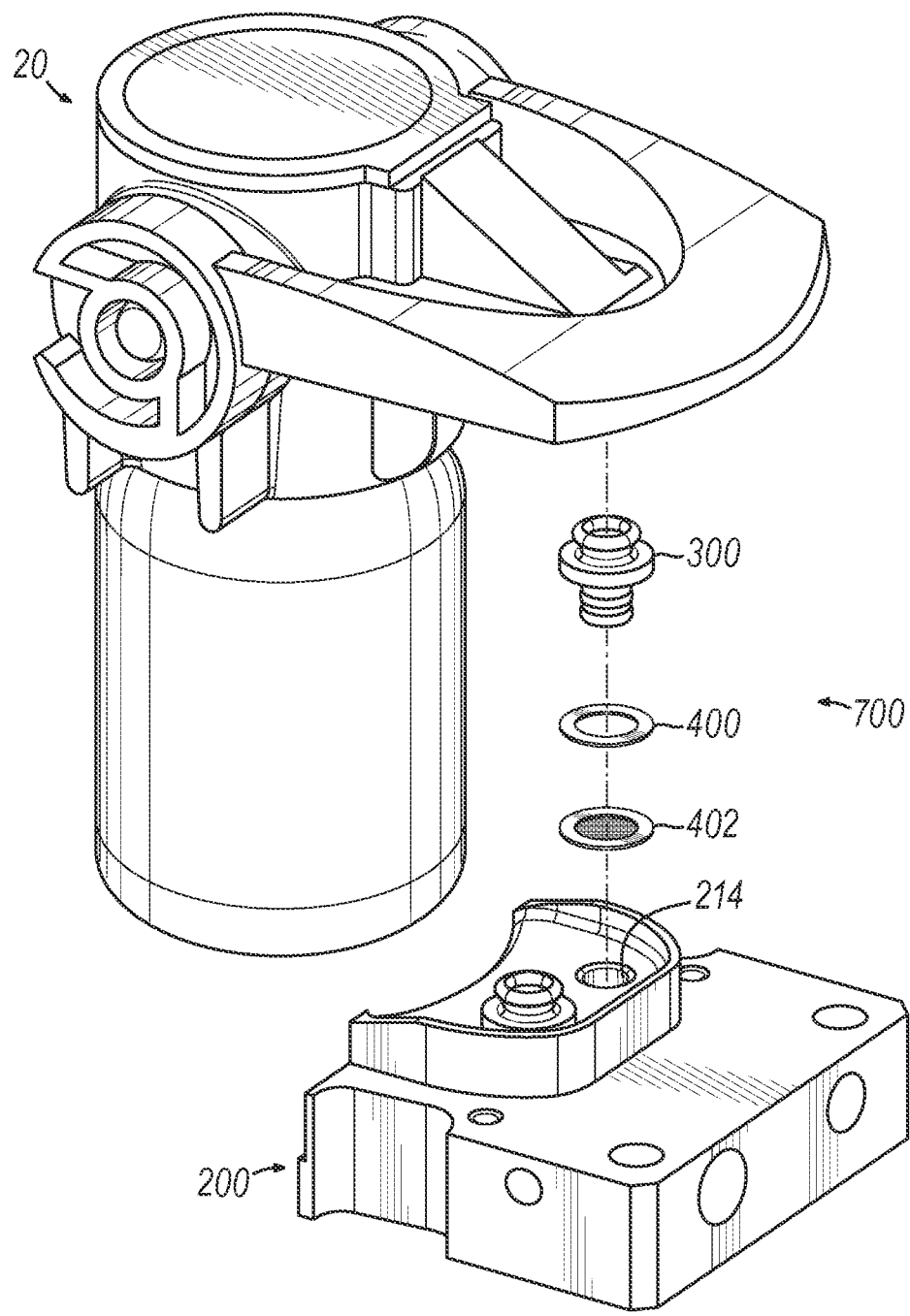
FIG. 9 depicts an exploded view of the reagent manifold of FIG. 3, showing a manifold seal and filtration system including the gasket, retaining ring, and the filter.
Figure 12:
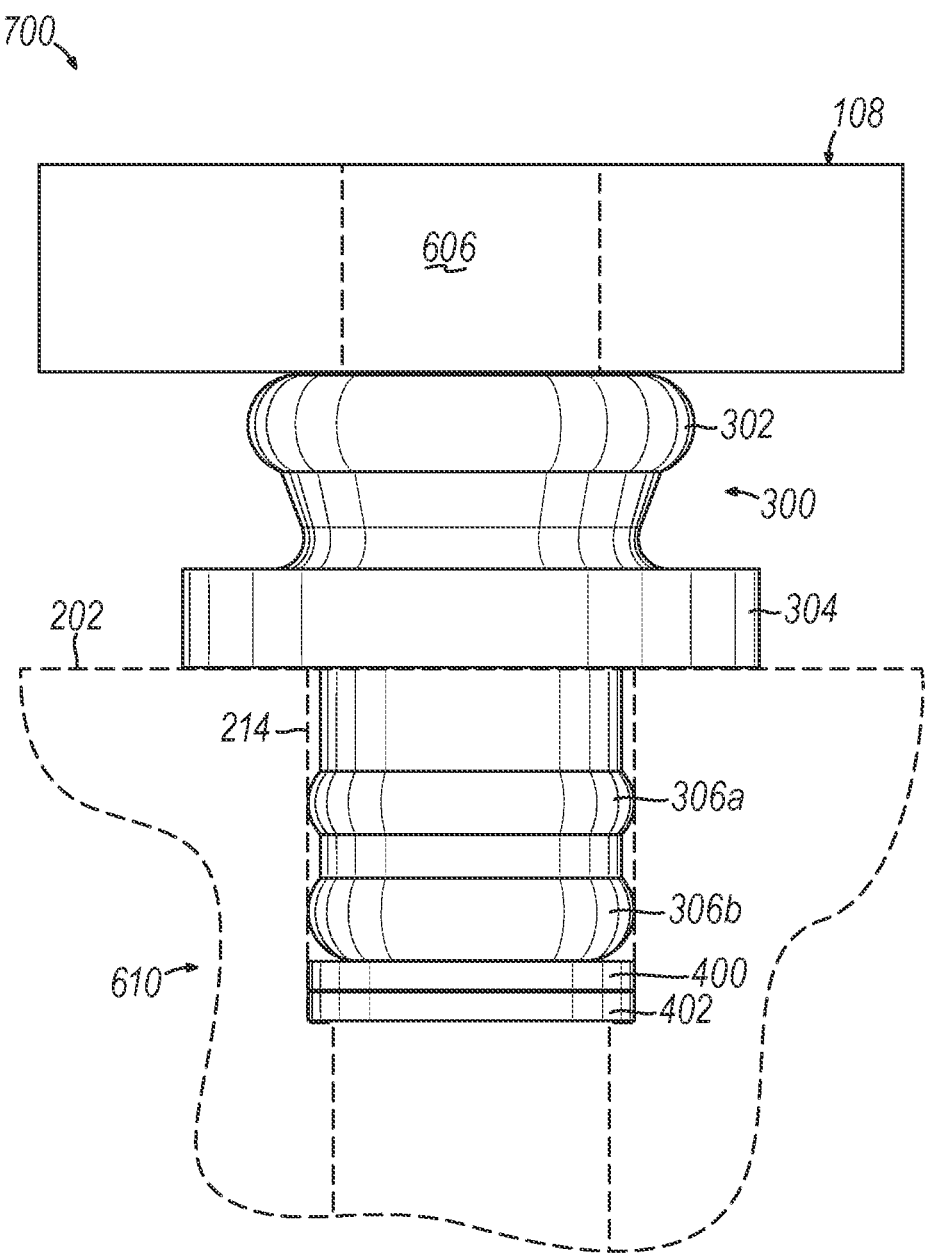
FIG. 12 depicts a schematic diagram showing the manifold seal and filtration system of FIG. 9 installed within the manifold.

FIG. 9 depicts an exploded view of the reagent manifold (200), showing a manifold seal and filtration system (700), which includes the gasket (300), the retaining ring (400), and the filter (402), in sequence, removed from the reagent channel bore (214), while FIG. 12 depicts a schematic diagram of the manifold seal and filtration system (700) removably installed or disposed within the reagent channel bore (214). The filter (402) is inserted into the reagent channel bore (214) first, and may have a snug or slight friction fit due to its diameter (410). The retaining ring (400) may then be inserted into the reagent channel bore (214), and may have a strong friction fit within the bore due to its diameter (404). The gasket (300) may then be inserted into the reagent channel bore (214), and, due to the gasket diameter, gasket material, and one or more radial seals (306a, 306b), provide a seal between the gasket (300) and the bore wall. The retaining ring (400) may hold the filter (402) in place within the bore, and may prevent the filter (402) from being unintentionally removed from the bore, which may dislodge and allow filtered particulate to pass through the system. Without the retaining ring (400), unintentional removal of the filter (402) may occur, for example, when removing the gasket (300) (e.g., such as where a fluid or dried particulate causes the gasket (300) to stick to the filter (402)), when cleaning the filter (402) (e.g., such as where a cleaning fluid is reversed through the system), and in other similar situations.

With reference to FIG. 12, a portion of the bottle cap (108) can be seen in contact with and sealed against the bellows seal (302) of the gasket (300), aligning the bottle cap reagent outlet (606) within the gasket (300) such that pressurized reagent may flow from the reagent bottle (20), through the reagent channel outlet (610), and on to the reagent distributor assembly or another device of the biological testing system without leakage. The limiter (304) can be seen in contact with the bottle receiver (202) limiting insertion of the gasket (300) to the desired depth, and the radial seals (e.g., the radial seal (306a), the radial seal (306b)) can be seen seated within and sealed against the inner wall of the reagent channel bore (214). It should be understood that FIG. 12 is an illustration of the manifold seal and filtration system (700) installed within the reagent channel bore (214), and that in actual use the radial seals and other inserted portions of the gasket (300) may have different levels of compression or depression, resulting in varying levels of contact between the gasket (300) and the reagent channel bore (214) than are illustrated in FIG. 12.

Some implementations may include selecting a material or finish for the bore having a first color, and selecting a material or finish for the retaining ring (400) having a second color, and selecting the first color and the second color to provide a visual contrast. In this manner, visual observation of the reagent channel bore (214) may confirm proper placement of the retaining ring (400) during maintenance and inspection. Some implementations may sandwich the filter (402) between a pair of the retaining ring (400), which may further isolate movements of the filter (402) during normal use or cleaning. Due to the path that reagent takes through the reagent manifold (200), as described in the context of FIG. 11, it may be unnecessary to place a filter such as the filter in the air channel bore (216), and so some implementations of the reagent manifold (200) may include only a single filter in the reagent channel bore (214).

IV. Exemplary Manifold Maintenance Method

Figure 10:
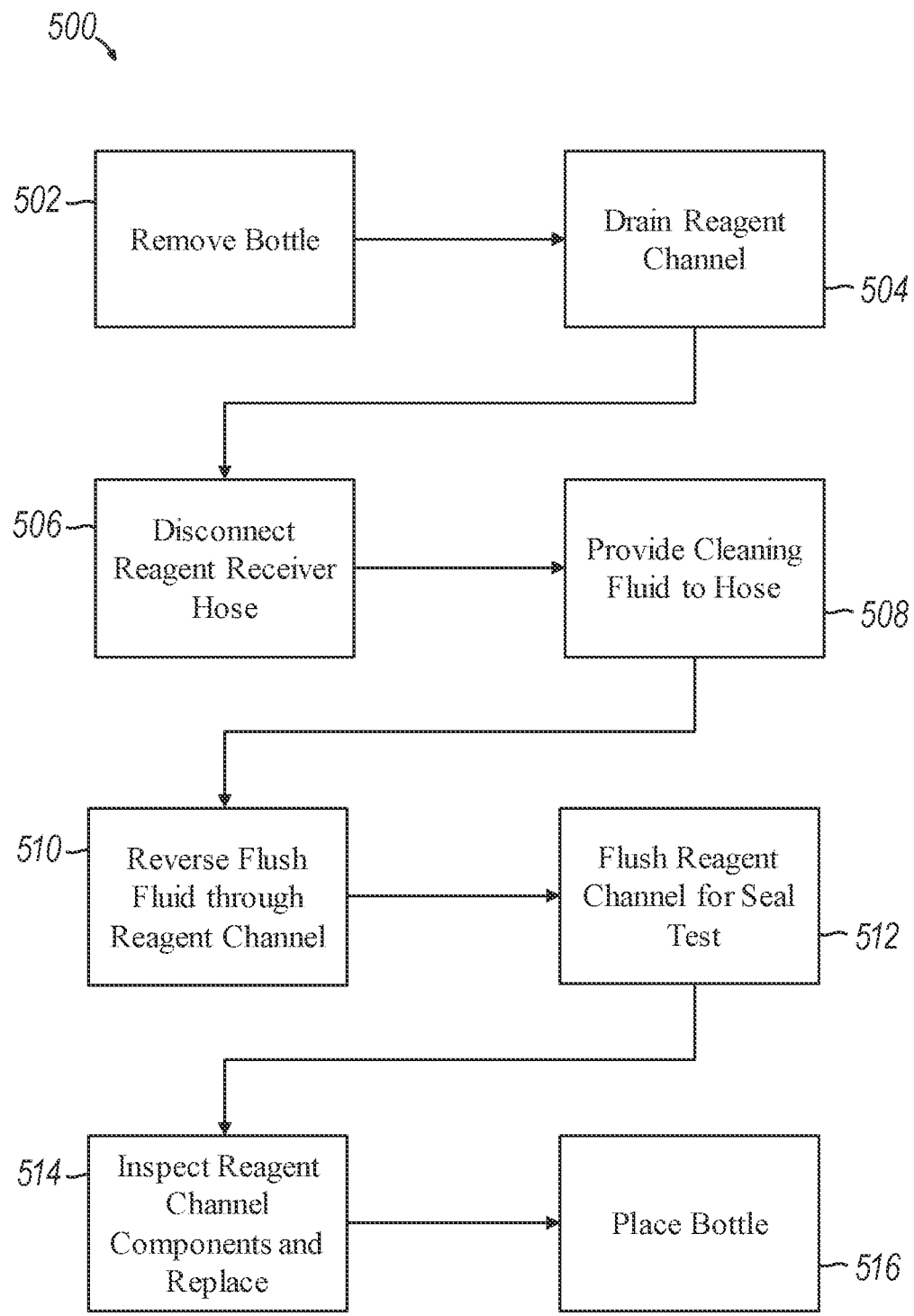
FIG. 10 depicts a flowchart of an exemplary set of steps that may be performed to clean and maintain the reagent manifold of FIG. 3.

Implementing one or more of the features disclosed herein may advantageously increase the robustness and performance of biological testing systems, and may allow for end users to perform maintenance and component replacement tasks instead of relying upon trained technicians. As an example, the bottle holder assembly (10) allows a user to replace an empty reagent bottle, while the gasket (300) and the filter (402) prevent particulate transfer and seal related leakages related to bottle replacement. The gasket (300) itself is removable and replaceable, as many materials that will allow for a proper seal will also degrade over time due to reagent exposure. Similarly, the retaining ring (400) prevents the filter (402) from being displaced during gasket (300) replacement. As an additional example, an implementation such as that shown in FIG. 9 allows for a user to flush and clean particulate from the filter (402) while minimizing risks related to later improper sealing. As an example, FIG. 10 depicts a flowchart of an exemplary set of steps (500) that may be performed to clean and maintain the reagent manifold (200).

When maintenance is needed (e.g., when the reagent bottle (20) is being replaced, based upon a configured maintenance interval, or based upon a decreased flow of reagent), a user may remove (block 502) the reagent bottle (20) from the bottle holder assembly (10). The reagent outlet channel (610) may then be drained (block 504), either manually by a user or automatically as a result of removal of the reagent bottle (20). A user may disconnect (block 506) a reagent receiver hose (e.g., the system reagent receiver (612)) at one end, while leaving the other end attached to the reagent outlet channel (610), and may provide (block 508) cleaning fluid to the hose (e.g., immersing the open end in a container of cleaning fluid, attaching a container of cleaning fluid to the open end). Cleaning fluid appropriate for flushing the reagent manifold (200) may include, for example, water, isopropyl alcohol, water soluble detergents, or combinations thereof.

Fluid may then be reverse flushed (block 510) through the reagent outlet channel (610), causing the fluid to flow through the filter (402) in the reverse direction and wash particulate from the filter, causing it to exit the reagent outlet channel (610) and flow away from the bottle receiver (202), with the spill guard (204) preventing flow of the fluid towards the rear of the bottle holder assembly (10). Reverse flushing (block 510) the reagent outlet channel (610) may be performed by using a pump or pressurized container of cleaning fluid to force liquid through from the reagent channel outlet opening (208b) side, or by inserting a syringe or other suction tool into the gasket (300) and creating negative pressure to pull liquid through from the reagent channel outlet opening (208a) side.

The user may then flush (block 512) the reagent channel to test the gasket (300) seal against the reagent manifold (200) by using a syringe, pump, or other pressurizing tool to provide a flow of water or other liquid through the reagent outlet channel (610) from the reagent channel outlet opening (208a) side. The seals may be tested by flushing (block 512) at various pressures, with or without the disconnected hose end being blocked, with any liquid leaking out from around the edges of the gasket (300) (e.g., from underneath the limiter (304)) indicating that the gasket (300) or another component needs further maintenance or replacement. The user may then inspect (block 514) the components of the reagent outlet channel (610), including inspecting the filter (402) for crystal particulate, inspecting the gasket (300) for degradation or wear, inspecting the retaining ring (400) and the filter (402) to ensure proper positioning and order, or other similar tasks. Replacement of the gasket (300), filter (402), or other components may include selecting a gasket having a particular material appropriate for the reagent contained in the reagent bottle (420), selecting a filter having a particular material, porosity, hole size, or other characteristic appropriate for the reagent contained in the reagent bottle (420), or both. With the reagent outlet channel (610) inspected and reassembled, the user may then place (block 516) the reagent bottle (20) back into the bottle holder assembly (10) and lock it into place using the bottle handle (110).

V. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A manifold system adapted for use in a sample testing instrument, the manifold system comprising: a manifold comprising: a bottle receiver adapted to couple a bottle of reagent with an air intake channel and a reagent outlet channel when the bottle is placed in the bottle receiver, the air intake channel defined by the manifold and comprising an air channel bore, the air intake channel adapted to allow the flow of air from a connected air source to the bottle, and the reagent outlet channel defined by the manifold and comprising a reagent channel bore, the reagent outlet channel adapted to allow the flow of reagent from the bottle to a reagent distributor assembly of the sample testing instrument, an air gasket removably disposed within the air channel bore, wherein the air gasket is adapted to seal and control the flow of air to the bottle; a reagent gasket removably disposed within the reagent channel bore, wherein the reagent gasket is adapted to seal and control the flow of reagent from the bottle; and a filter removably disposed within the reagent channel bore between the reagent gasket and the reagent distributor assembly and adapted to prevent particulate from passing through the reagent outlet channel towards the reagent distributor assembly.

Example 2

The manifold system of example 1, further comprising a retaining portion removably disposed within the reagent channel bore and proximate to the filter, wherein: the retaining portion is adapted to friction fit within the reagent channel bore and hold the filter in place; and the retaining portion is disposed between the filter and the reagent gasket.

Example 3

The manifold system of example 2, wherein the retaining portion is adapted so that a force of the friction fit within the reagent channel bore is sufficient to prevent the filter from being displaced when: the reagent gasket is removed from the reagent channel bore; and the reagent outlet channel is flushed with a liquid to clear particulate from the filter.

Example 4

The manifold system of any one or more of examples 2 through 3, wherein: the reagent channel bore comprises a first color; the retaining portion comprises a second color; and the second color contrasts against the first color.

Example 5

The manifold system of any one or more of examples 2 through 4, further comprising a second retaining portion positioned between the filter and the reagent receiver, wherein the second retaining ring is adapted to friction fit within the reagent channel bore.

Example 6

The manifold system of any one or more of examples 1 through 5, wherein there is no filter disposed within the air channel bore.

Example 7

The manifold system of any one or more of examples 1 through 6, wherein the reagent gasket comprises: a limiter positioned on an external portion, the limiter comprising a diameter larger than the reagent channel bore to prevent over-insertion of the reagent gasket into the reagent channel bore; a bellows seal positioned on the external portion and adapted to create a seal between the external portion and the bottle; and an internal portion comprising a diameter corresponding to the reagent channel bore to allow insertion into the reagent channel bore, the internal portion comprising a set of radial seals adapted to create a seal between the internal portion and the reagent channel bore.

Example 8

The manifold system of example 7, wherein the reagent gasket comprises an elastomer material having a durometer of 50A.

Example 9

The manifold system of any one or more of examples 7 through 8, wherein the strength of the seal between the internal portion and the reagent channel bore is not substantially influenced by the contact of the bottle with the bellows seal.

Example 10

The manifold system of any one or more of examples 7 through 9, wherein the bellows seal is of a diameter larger than the reagent channel bore to prevent the reagent gasket from being inserted into the reagent channel bore upside down.

Example 11

The manifold system of any one or more of examples 1 through 10, wherein the reagent gasket comprises a material selected based on a reagent contained in the bottle, and wherein the material comprises: when the reagent is a first reagent type that comprises an alpha-naphthol: a fluorosilicone, or a fully dynamically vulcanized ethylene propylene diene monomer in a thermoplastic matrix of polypropylene, and when the reagent is a second reagent type that does not comprise an alpha-naphthol: a perfluoroelastomer, a tetra polymer of ethylene, tetrafluoroethylene and perfluoromethylvinylether, a highly fluorinated fluorocarbon, a tetrafluoroethylene propylene, a fluoroelastomer, or a chlorosulfonated polyethylene.

Example 12

The manifold system of any one or more of examples 1 through 11, wherein the filter comprises one or more of: a porosity of between about 50% and about 70%, a thickness of between about 50 um and about 160 um, a mesh, or a peek plastic mesh.

Example 13

A method comprising: installing a manifold on a bottle holder assembly, the manifold comprising: a bottle receiver adapted to couple a bottle of reagent with an air intake channel and a reagent outlet channel when the bottle is placed in the bottle receiver, the air intake channel defined by the manifold and comprising an air channel bore, the air intake channel adapted to allow the flow of air from a connected air source to the bottle, and the reagent outlet channel defined by the manifold and comprising a reagent channel bore, the reagent outlet channel adapted to allow the flow of reagent from the bottle to a reagent distributor assembly of the sample testing instrument, removably installing a filter within the reagent channel bore, the filter adapted to prevent particulate from passing through the reagent outlet channel towards a reagent distributor assembly; removably installing an air gasket within the air channel bore, wherein the air gasket is adapted to seal and control the flow of air to the bottle; and removably installing a reagent gasket within the reagent channel bore, wherein the reagent gasket is adapted to seal and control the flow of reagent from the bottle.

Example 14

The method of example 13, further comprising, before installing the reagent gasket and after installing the filter, removably installing a retaining portion within the reagent channel bore, wherein the retaining portion is adapted to friction fit within the reagent channel bore and hold the filter in place.

Example 15

The method of example 14, further comprising visually confirming installation of the retaining portion based upon a first color of the manifold contrasting with a second color of the retaining portion.

Example 16

The method of any one or more of examples 13 through 15, wherein removably installing the reagent gasket within the reagent channel bore comprises: identifying an internal portion of the reagent gasket based upon the internal portion comprising: a diameter corresponding to the reagent channel bore to allow insertion into the reagent channel bore, and a set of radial seals adapted to create a seal between the internal portion and the reagent channel bore; inserting the internal portion into the reagent channel bore until a limiter positioned on an external portion of the reagent gasket contacts the manifold, the limiter comprising a diameter larger than the reagent channel bore to prevent over-insertion of the reagent gasket into the reagent channel bore.

Example 17

The method of example 16, further comprising coupling a bottle of reagent with the manifold by positioning the bottle in the bottle receiver so that a bellows seal of the reagent gasket seals against the bottle.

Example 18

The method of example 17, further comprising operating a bottle handle of the bottle to lock the bottle in place and create a downwards force against the bellows seal, wherein operation of the bottle handle does not substantially influence the strength of the seal between the internal portion and the reagent channel bore.

Example 19

The method of any one or more of examples 13 through 18, wherein removably installing a reagent gasket within the reagent channel bore comprises selecting the reagent gasket based upon a material of the reagent gasket corresponding with a reagent of the reagent bottle, wherein: when the reagent is a first reagent type that comprises an alpha-naphthol, the material comprises: a fluorosilicone, or a fully dynamically vulcanized ethylene propylene diene monomer in a thermoplastic matrix of polypropylene, and when the reagent is a second reagent type that does not comprise an alpha-naphthol, the material comprises: a perfluoroelastomer, a tetra polymer of ethylene, tetrafluoroethylene and perfluoromethylvinylether, a highly fluorinated fluorocarbon, a tetrafluoroethylene propylene, a fluoroelastomer, or a chlorosulfonated polyethylene.

Example 20

A manifold seal and filtration system comprising: a filter adapted to: be removably disposed within a reagent channel bore of a manifold, and prevent particulate from passing through the manifold towards a reagent distributor assembly; a retaining portion adapted to: be removably disposed within the reagent channel bore, and friction fit within the reagent channel bore and hold the filter in place; and a reagent gasket comprising: a limiter positioned on an external portion, the limiter comprising a diameter larger than the reagent channel bore to prevent over-insertion of the reagent gasket into the reagent channel bore, a bellows seal positioned on the external portion and adapted to create a seal between the external portion and a bottle of reagent coupled with the manifold, and an internal portion comprising a diameter corresponding to the reagent channel bore to allow insertion into the reagent channel bore, the internal portion comprising a set of radial seals adapted to create a seal between the internal portion and the reagent channel bore.

VI. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A manifold system adapted for use in a sample testing instrument, the manifold system comprising:
   (a) a manifold comprising:
      (i) an air inlet channel and a reagent outlet channel,
      (ii) a bottle receiver adapted to couple a bottle of reagent with the air intake channel and the reagent outlet channel when the bottle is placed in the bottle receiver,
      (iii) the air intake channel comprising an air channel bore, the air intake channel adapted to allow the flow of air from a connected air source to the bottle, and
      (iv) the reagent outlet channel comprising a reagent channel bore, the reagent outlet channel adapted to allow the flow of reagent from the bottle to a reagent distributor assembly of the sample testing instrument,
   (b) an air gasket removably disposed within the air channel bore, wherein the air gasket is adapted to seal and control the flow of air to the bottle;
   (c) a reagent gasket removably disposed within the reagent channel bore, wherein the reagent gasket is adapted to seal and control the flow of reagent from the bottle; and
   (d) a filter removably disposed within the reagent channel bore between the reagent gasket and the reagent distributor assembly and adapted to prevent particulate from passing through the reagent outlet channel towards the reagent distributor assembly.

2. The manifold system of claim 1, wherein there is no filter disposed within the air channel bore.

3. The manifold system of claim 1, wherein the reagent gasket comprises a material selected based on a reagent contained in the bottle, and wherein the material comprises:
   (a) when the reagent is a first reagent type that comprises an alpha-naphthol:
      (i) a fluorosilicone, or
      (ii) a fully dynamically vulcanized ethylene propylene diene monomer in a thermoplastic matrix of polypropylene, and
   (b) when the reagent is a second reagent type that does not comprise an alpha-naphthol:
      (i) a perfluoroelastomer,
      (ii) a tetra polymer of ethylene, tetrafluoroethylene and perfluoromethylvinylether,
      (iii) a highly fluorinated fluorocarbon,
      (iv) a tetrafluoroethylene propylene,
      (v) a fluoroelastomer, or
      (vi) a chlorosulfonated polyethylene.

4. The manifold system of claim 1, wherein the filter comprises one or more of:
   (a) a porosity of between about 50% and about 70%,
   (b) a thickness of between about 50 um and about 160 um,
   (c) a mesh, or
   (d) a peek plastic mesh.

5. The manifold system of claim 1, further comprising a retaining portion removably disposed within the reagent channel bore and proximate to the filter, wherein:
   (a) the retaining portion is adapted to friction fit within the reagent channel bore and hold the filter in place; and
   (b) the retaining portion is disposed between the filter and the reagent gasket.

6. The manifold system of claim 5, wherein the retaining portion is adapted so that a force of the friction fit within the reagent channel bore is sufficient to prevent the filter from being displaced when:
   (a) the reagent gasket is removed from the reagent channel bore; and
   (b) the reagent outlet channel is flushed with a liquid to clear particulate from the filter.

7. The manifold system of claim 5, wherein:
   (a) the reagent channel bore comprises a first color;
   (b) the retaining portion comprises a second color; and
   (c) the second color contrasts against the first color.

8. The manifold system of claim 5, further comprising a second retaining portion positioned between the filter and the reagent receiver, wherein the second retaining ring is adapted to friction fit within the reagent channel bore.

9. The manifold system of claim 1, wherein the reagent gasket comprises:

(a) a limiter positioned on an external portion of the reagent gasket, the limiter comprising a diameter larger than the reagent channel bore to prevent over-insertion of the reagent gasket into the reagent channel bore;

(b) a bellows seal positioned on the external portion of the reagent gasket and adapted to create a seal between the external portion and the bottle; and (c) an internal portion of the reagent gasket comprising a diameter corresponding to a diameter of the reagent channel bore to allow insertion into the reagent channel bore, the internal portion comprising a set of radial seals adapted to create a seal between the internal portion and the reagent channel bore.

10. The manifold system of claim 9, wherein the reagent gasket comprises an elastomer material having a durometer of 50A.

11. The manifold system of claim 9, wherein a strength of a seal between the internal portion and the reagent channel bore of the reagent gasket is not substantially influenced by contact of the bottle with the bellows seal.

12. The manifold system of claim 9, wherein the bellows seal is of a diameter larger than the diameter of the reagent channel bore to prevent the reagent gasket from being inserted into the reagent channel bore upside down.

13. A method comprising:
   (a) installing a manifold on a bottle holder assembly, the manifold comprising:
      (i) an air intake channel and a reagent outlet channel,
      (ii) a bottle receiver adapted to couple a bottle of reagent with the air intake channel and the reagent outlet channel when the bottle is placed in the bottle receiver,
      (iii) the air intake channel comprising an air channel bore, the air intake channel adapted to allow the flow of air from a connected air source to the bottle, and
      (iv) the reagent outlet channel comprising a reagent channel bore, the reagent outlet channel adapted to allow the flow of reagent from the bottle to a reagent distributor assembly of the sample testing instrument,
   (b) removably installing a filter within the reagent channel bore, the filter adapted to prevent particulate from passing through the reagent outlet channel towards a reagent distributor assembly;
   (c) removably installing an air gasket within the air channel bore, wherein the air gasket is adapted to seal and control the flow of air to the bottle; and
   (d) removably installing a reagent gasket within the reagent channel bore, wherein the reagent gasket is adapted to seal and control the flow of reagent from the bottle.

14. The method of claim 13, wherein removably installing a reagent gasket within the reagent channel bore comprises selecting the reagent gasket based upon a material of the reagent gasket corresponding with a reagent of the reagent bottle, wherein:
   (a) when the reagent is a first reagent type that comprises an alpha-naphthol, the material comprises:
      (i) a fluorosilicone, or
      (ii) a fully dynamically vulcanized ethylene propylene diene monomer in a thermoplastic matrix of polypropylene, and
   (b) when the reagent is a second reagent type that does not comprise an alpha-naphthol, the material comprises:
      (i) a perfluoroelastomer,
      (ii) a tetra polymer of ethylene, tetrafluoroethylene and perfluoromethylvinylether,
      (iii) a highly fluorinated fluorocarbon,
      (iv) a tetrafluoroethylene propylene,
      (v) a fluoroelastomer, or
      (vi) a chlorosulfonated polyethylene.

15. The method of claim 13, further comprising, before installing the reagent gasket and after installing the filter, removably installing a retaining portion within the reagent channel bore, wherein the retaining portion is adapted to friction fit within the reagent channel bore and hold the filter in place.

16. The method of claim 15, further comprising visually confirming installation of the retaining portion based upon a first color of the manifold contrasting with a second color of the retaining portion.

17. The method of claim 13, wherein removably installing the reagent gasket within the reagent channel bore comprises:
   (a) identifying an internal portion of the reagent gasket based upon the internal portion comprising:
      (i) a diameter corresponding to a diameter of the reagent channel bore to allow insertion of the reagent gasket into the reagent channel bore, and
      (ii) a set of radial seals adapted to create a seal between the internal portion and the reagent channel bore;
   (b) inserting the internal portion into the reagent channel bore until a limiter positioned on an external portion of the reagent gasket contacts the manifold, the limiter comprising a diameter larger than the diameter of the reagent channel bore to prevent over-insertion of the reagent gasket into the reagent channel bore.

18. The method of claim 17, further comprising coupling a bottle of reagent with to manifold by positioning the bottle in the bottle receiver so that a bellows seal of the reagent gasket seals against the bottle.

19. The method of claim 18, further comprising operating a bottle handle of the bottle to lock the bottle in place and create a downwards force against the bellows seal, wherein operation of the bottle handle does not substantially influence a strength of a seal between the internal portion of the reagent gasket and the reagent channel bore.

* * * * *